United States Patent [19]

Isoi et al.

[11] Patent Number: 4,980,249

[45] Date of Patent: Dec. 25, 1990

[54] ELECTROLYTE FEEDER FOR BATTERY

[75] Inventors: Toshihiro Isoi; Masakazu Sato, both of Takatsuki; Hiroyuki Suzuki; Shuji Takahashi, both of Wako, all of Japan

[73] Assignees: Yuasa Battery Co., Ltd., Osaka; Honda Giken Kogyo Kabushiki Kaisha, Tokyo, both of Japan

[21] Appl. No.: 465,291

[22] Filed: Jan. 16, 1990

[30] Foreign Application Priority Data

Jan. 20, 1989 [JP] Japan ................................. 1-5793[U]
Apr. 4, 1989 [JP] Japan ................................. 1-40076[U]

[51] Int. Cl.⁵ ............................................. H01M 2/36
[52] U.S. Cl. .................................... 429/122; 141/241; 429/118
[58] Field of Search ................... 429/72, 80, 113, 116, 429/118, 122; 141/237, 241, 242, 297, 298, 308, 307, 309; 137/255, 260, 396

[56] References Cited

U.S. PATENT DOCUMENTS 4,565,750  1/1986  Isoi et al. ................................. 429/80
4,833,047  5/1989  Isoi et al. ................................. 429/72

FOREIGN PATENT DOCUMENTS 0128548  6/1988  Japan .
0128549  6/1988  Japan .
0128550  6/1988  Japan .

Primary Examiner—Donald L. Walton
Attorney, Agent, or Firm—Armstrong, Nikaido, Marmelstein, Kubovcik & Murray

[57] ABSTRACT

An electrolyte feeder for battery in order to fill an electrolyte into a battery comprising plural cells, integrally having shell bodies equal in number to the number of cells, filling hole at tip and of each shell body being sealed up by a thin film, the thin film being designed to be broken by a filling sleeve of battery so as to improve an efficiency of filling the electrolyte, and bottom parts of the shell bodies being connected each other by the communicating means in order to avoid failure to fill the electrolyte and facilitate replacement of the electrolyte with air.

3 Claims, 6 Drawing Sheets

ELECTROLYTE FEEDER FOR BATTERY

BACKGROUND OF THE INVENTION

1. Industrial useful field

This invention relates to an electrolyte feeder for battery in order to fill an electrolyte into a battery composed of plural cells.

2. Prior art

Figure 3:
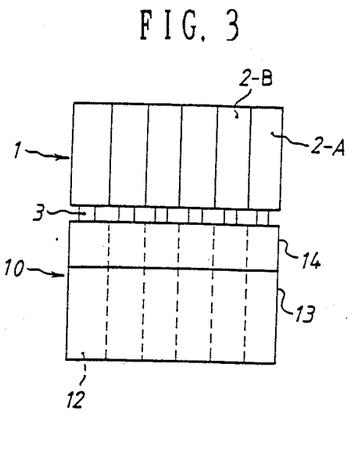
FIG. 3 is a front view of a battery and electrolyte container showing a state where the electrolyte is filled.
Figure 9:
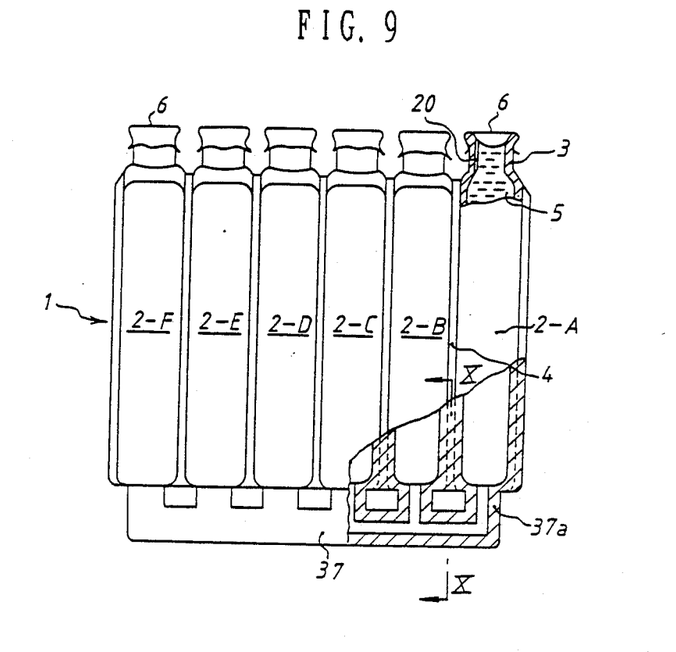
FIG. 9 is a partially fragmental front view of the electrolyte container equipped with another communicating means.

Various feeders for feeding an electrolyte into a battery composed of plural cells have conventionally been proposed. A newest one among them is disclosed in Japan Utility Model Publication KOKAI No. 63-93067. In this feeder; shell bodies 2 in each of which an electrolyte of cell unit is filled are interconnected in the same quantity as that of cell as illustrated by FIG. 3 for example, an openable thin film is formed on an edge of a filling tube 3, each shell body is sealed by the thin film, and an air groove 20 for feeding air to the shell body 2 is formed on an inner peripheral surface of the filling tube 3 as illustrated by FIG. 9.

Figure 13:
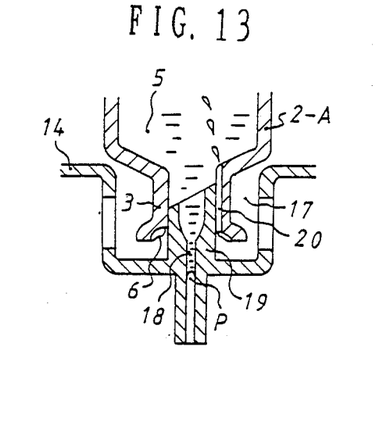
FIG. 13 is an enlarged sectional view of a filling port according to a conventional electrolyte feeder.

To fill the electrolyte by using the feeder having such structure, the container is turned upside down to fit each filling tube 3 into each filling sleeve 19 of a recessed part (filling port 17) of a battery cover 14 as illustrated by FIG. 13. In a very compact battery such as that for a motor bicycle, however, an inside diameter of a filling hole 18 (filling passage) of the filling sleeve 19 is small (01 to 02 mm), the filling hole 18 is clogged with bubbles P due to a low water head and an influence of surface tension, and air becomes not displaced through the air groove 20. Therefore, such a case will arise that it becomes impossible to fill (feed) the electrolyte into the battery.

Figure 14:
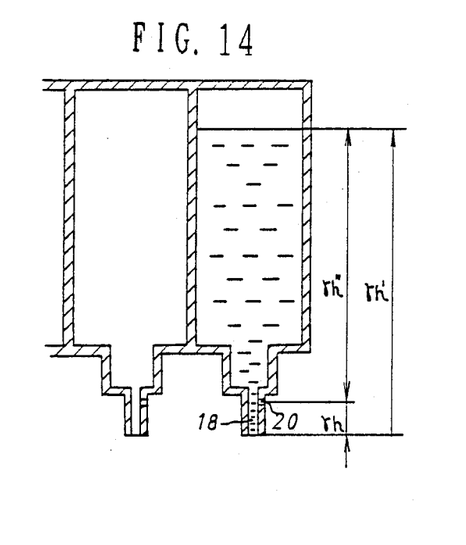
FIG. 14 is a working principle explanatory view of the conventional electrolyte feeder.

The above-mentioned low water head (abbreviated to "head" hereunder) will be described in details hereunder. FIG. 14 is the working principle explanatory view showing a head difference etc. when filling the electrolyte, in which the air groove 20 is shown in a simplified form by a position of an upper part of air groove in order for easy understanding of the head difference. In this FIG. 14, a head of $\gamma h'$ acts on a lower end of the filling hole 18 and a head of $\gamma h''$ acts on the air groove 20, so that a head which is substantially acting for filling the electrolyte will be given as follows:

$$\gamma h' - \gamma h'' = \gamma h$$

Namely, only an extremely small head will act on the electrolyte.

Therefore, as described above, in case of the filling hole 18 having a small inside diameter, bubbles will clog the hole by overcoming the foregoing head $\gamma h$ for some reason or others due to the influence of surface tension, so that such a case will arise that it becomes impossible to fill the electrolyte in the batery.

OBJECT OF THE INVENTION

An object of the invention is to enable filling of an electrolyte without using a nipper etc. and without making an air hole on an electrolyte container when filling the electrolyte, and to enable replacement of air with the electrolyte without obstructing the filling of the electrolyte in case of a small battery etc.

SUMMARY OF THE INVENTION

In order to accomplish the above object in this invention; an electrolyte feeder for battery is provided, in which shell bodies filled with electrolyte of cell units of battery are connected in the same quantity as the cell to form an electrolyte container. A filling tube is provided on each shell body. Each filling tube is aligned with each filling port of the battery. A thin film is formed at a tip end of the filling tube. Each shell body is sealed with the thin film. A communicating means which communicates lower parts of shell bodies each other is provided. A filling hole communicating to each cell is made on each filling port of the battery. An upwardly extending filling sleeve fitting freely in an inner periphery of the filling tube of the electrolyte container is formed on a portion of the filling hole. A piercing part is formed on top of the filling sleeve. An air groove for feeding air into the electrolyte container is formed on a portion where the filling sleeve fits in the filling tube.

When the filling tube of the electrolyte container is fitted in the filling sleeve of the battery, the thin film is broken by a tip end of the sleeve.

During filling the electrolyte in the battery, air is sent into the container through the air groove so that the electrolyte can be replaced with air smoothly.

Even if the filling of the electrolyte by means of the shell body becomes impossible temporarily due to clogging of air in any one of air grooves when filling the electrolyte in the battery, air is fed into the shell body through the communicating means from other shell body or bodies in which the electrolyte has already been filled, so that a large head difference can be secured and the filling of the electrolyte can be started or restarted.

As a concrete structure of the communicating means, a communicating hole for communicating shell bodies each other may be made at a lower portion of a connecting part which connects shell bodies each other.

As another concrete communicating means, a communicating pipe may be formed integrally below a lower surface of the electrolyte container so that the communicating pipe can be connected to shell body insides through communicating branch pipes for respective shell bodies.

BRIEF DESCRIPTION OF THE INVENTION

DETAILED DESCRIPTION OF THE INVENTION

Embodiment 1

FIG. 3 shows a state where an electrolyte is filled in a battery 10 from an electrolyte container 1. The battery 10 has a cover 14 on a container 13, the container 13 is divided into for example six cell chambers 12 by partition walls, and an assembled element consisting of positive and negative plates, separators etc. is put in each cell chamber 12.

A hollow filling port 17 is formed on top of the cover 4 correspondingly to each cell chamber 12 as illustrated by FIG. 14, an upwardly extending filling sleeve 19 is formed at a central part of the filling port 17, and an air hole 26 for communicating the cell chamber 12 with the filling port 12 is formed on a peripheral wall of the filling port 17.

A cylindrically extending part 21 extending downward is integrally formed at a lower end of the filling sleeve 19, and a filling hole 18 communicating to the lower cell chamber 12 is formed in the foregoing sleeve 19 and the cylindrically extending part 21. An inside diameter of the filling hole 18 is narrowed at its lower portion in order for regulating a filling speed. When the filling speed is too large, it can not be balanced with an electrolyte absorbing speed of negative and positive plates and separators to cause overflow of the electrolyte and failure to output a prescribed battery performance, so that the filling speed is fixed to 0.5 to 2.0 cc/sec.

Further, an aluminum foil 23 on the cover side of which is coated with synthetic resin, is secured to an upper surface of the cover 14 before filling the electrolyte. The aluminum foil 23 seals the filling port 17, thereby preventing the charged positive and negative plates in the cell chamber 12 from being exposed to the atmosphere.

An upper end of the filling sleeve 19 is cut diagonally to form an inclining surface so that a tip end portion of the inclining surface can be utilized as a piercing part 22.

Figure 1:
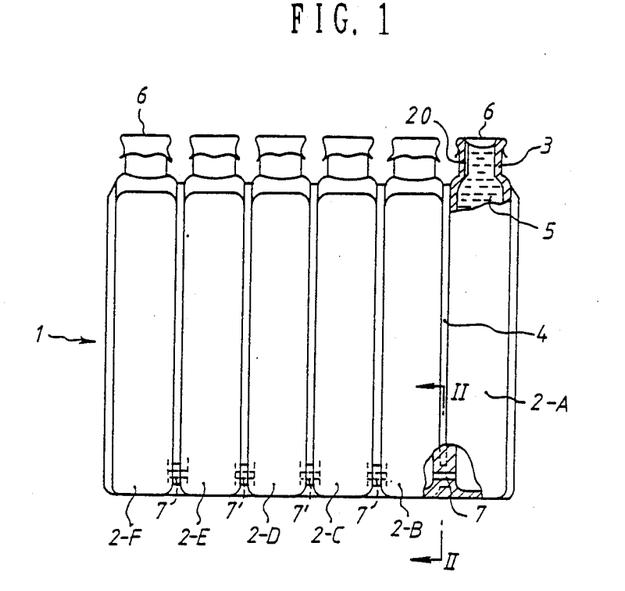
FIG. 1 is a partially fragmental front view of the electrolyte container for battery according to the invention.
Figure 2:
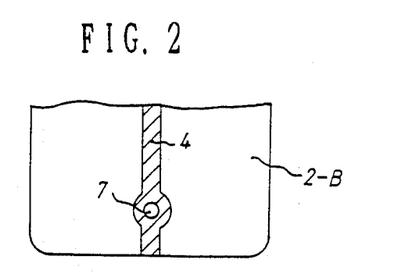
FIG. 2 is an enlarged sectional view taken along a line II—II of FIG. 1.

In FIG. 1 showing the electrolyte container 1, a polyolefin resin electrolyte container 1 comprises approximately parallelepiped six fold shell bodies 2 (2-A . . . , 2-F for example). A connecting part 4 is integrally formed between the shell bodies 2, and the shell bodies 2 are connected together by the connecting part 4. Insides of all the shell bodies 2 are hollowed to be isolated into each shell body 2, and an electrolyte 5 of each cell unit of battery is stored in the shell body 2.

A communicating hole 7 is formed at a lower end of the connecting part 4 as a communicating means in a position near to a bottom wall of the shell body 2, and insides of neighboring shell bodies 2 are connected by the communicating hole 7. The above-mentioned communicating hole 7 is made on all the connecting parts existing between the shell bodies 2, and its inside diameter is set to a diameter of 01 to 05 mm, for example, which prohibits the displacement of the electrolyte (liquid) with air.

A cylindrical filling tube 3 is formed integrally on top of the shell body 2, a thin film 6 made of aluminum foil a backside of which is coated with synthetic resin is bonded by thermocompression to an upper end of the filling tube 3, and the upper end of the filling tube 3 is sealed by the thin film 6. One or plural air grooves 20 extending over the entire vertical length of the filling tube are formed on an inner peripheral surface of the filling tube 3. The air groove 20 is formed at a place corresponding to a position deviating in circumferential direction from the piercing part 22 at the tip end of the sleeve.

Figure 4:
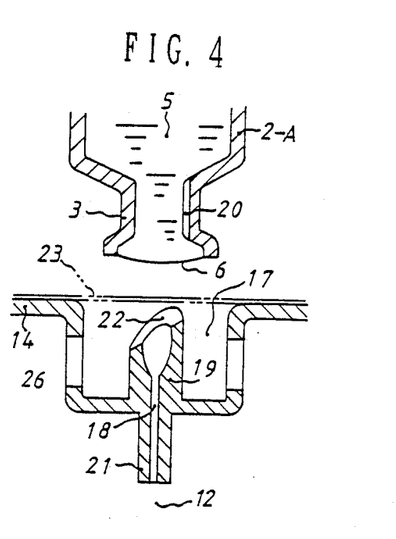
FIG. 4 is an enlarged sectional view showing a state immediately before fitting the filling tube in the filling port.

A distance between neighboring filling tubes 3 is the same as a distance between the filling ports 17 (FIG. 4) formed on respective cells of the battery 10 of FIG. 3 so that all the filling tubes 3 can be fitted simultaneously in the filling ports 17.

A method of filling electrolyte will be described hereunder. The aluminum foil 23 of FIG. 3 is first peeled off from the cover 14 to expose the filling port 17.

Figure 5:
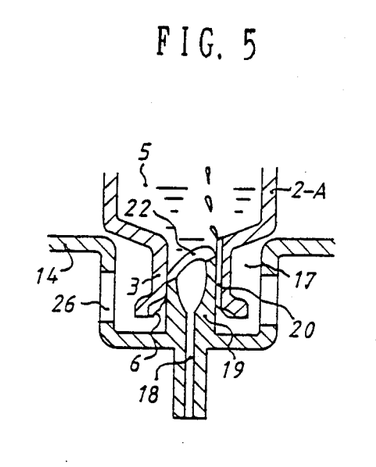
FIG. 5 is a sectional view corresponding to FIG. 4 showing a state where the filling tube is fitted in the filling port.

The electrolyte container 1 is next turned upside down so as to direct the filling tube 3 downward as illustrated by FIG. 3, then each filling tube 3 is inserted in each filling port 17 and fitted onto an outer periphery of the filling sleeve 19 as illustrated by FIG. 5. In this inserting work; the piercing part 22 at the tip end of the sleeve 19 serves as a preface to break the thin film 6, then the entire thin film is broken by the sleeve 19 so as to fit the filling tube 3 in the sleeve 19. A clearance is kept between the shell body 2-A and an upper edge of the filling port 17 so that an inside of the filling port 17 can communicate with the atmosphere.

Under the foregoing fitting state, the filling of the electrolyte 5 from each shell body of the electrolyte container 1 to each cell chamber 12 is commenced. Namely, the electrolyte 5 in the shell chamber 2 is replaced by air, which flows through the air groove 20 into the shell body 2, to be fed to an inside of the cell chamber 20. Air in the cell chamber 12 is discharged from an air hole 26.

Even if the filling hole 18 should be clogged with bubbles to cause the failure to fill the electrolyte in the corresponding cell chamber 12 due to the surface tension etc. in the same way as the foregoing prior art during filling the electrolyte, the filling of the electrolyte will be started or restarted according to the following process.

Figure 8:
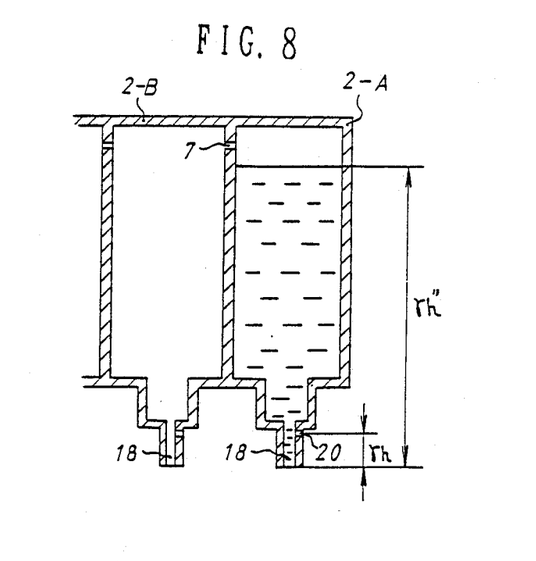
FIG. 8 is a working principle explanatory view during filling electrolyte.

Namely, as illustrated by the working principle explanatory view of FIG. 8, even if the filling hole 18 corresponding to the shell body 2-A is clogged with bubbles to cause failure to fill the electrolyte from the shell body 2-A, an inside of the shell body 2-A will communicate with the atmosphere through the communicating hole 7 and, at the same time, a head acting on the bottom of the filling hole 18 will be converted from $\gamma h$ to $\gamma h''$ if only the filling of the electrolyte to any one of the adjacent shell body 2-B or other shell bodies has been completed.

Figures 6, 7:
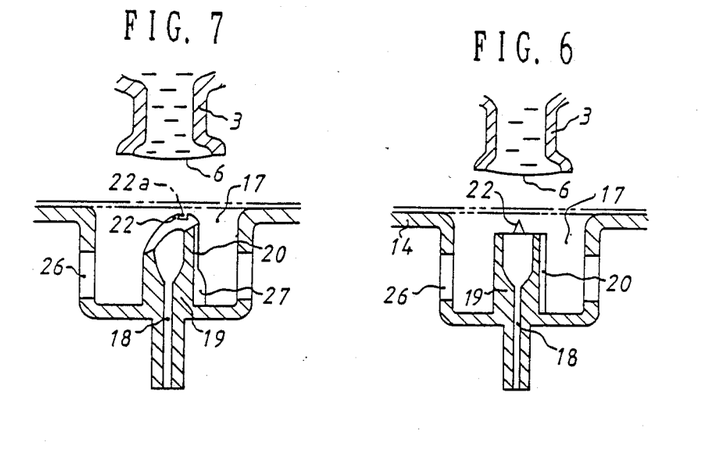
FIG. 6 and FIG. 7 are enlarged sectional views showing another embodiments of the filling port respectively.

Consequently, a large head acts abruptly on the bottom of the filling hole 18 to push forth the clogging bubble so as to commence the filling of the electrolyte in the shell body 2-A A 12V battery having six cell chambers 12 as shown in FIG. 6 comes substantially into wide use for a general battery, so that the electrolyte container 1 having six shell bodies 2 prevails correspondingly thereto. Even when five shell bodies 2 among six become not fillable with the electrolyte due to the clogging of bubbles in case of such an electrolyte container, the filling of the electrolyte to all the five shell bodies 2 will be automatically started after the filling to the remaining one shell body 2 has been completed, if only the electrolyte can be filled by the remaining one shell body.

Embodiment 2

In an embodiment illustrated in FIG. 6, the air groove 20 is formed on an outer peripheral surface of the filling sleeve 19 of the cover 14 for battery, and a conical projection 22 is formed on top of the filling sleeve 19 for serving as the piercing part 22. The air groove 20 is formed in a position deviating from the piercing part 22 in the circumferential direction.

Embodiment 3

In an embodiment illustrated in FIG. 7, a notch 22a is formed at a tip edge of steep slope of the sleeve 19. An end edge of the notch 22a formes a sharp edge like a teeth of saw so that it works more readily as a preface to break the thin film 6 of the electrolyte container 1.

Further, the air groove 20 is formed on the outer peripheral surface of the filling sleeve 19 in a position deviating in the circumferential direction from the tip end where the notch 22a is located.

Moreover, a rib 27 stretching round in radial direction is formed integrally on the outer peripheral surface of the sleeve 19 at a part corresponding to a bottom portion of the air groove 20.

According to the structure of FIG. 7, the thin film 6 can be simply broken by the edge of the notch 22a by only slightly pushing the electrolyte container 1 because the notch 22a is provided at the tip end. Furthermore, the provided notch 22a makes a broken piece of the thin film 6 round so that it becomes hard for the broken piece to enter the air groove 20.

When the filling tube 3 fits onto the filling sleeve 19, even if the piece of broken thin film 6 is apt to enter the air groove 20, the broken piece is pushed aside by the stretched rib 27 to be prevented from entering the groove. Further, even if the broken piece of the thin film 6 should enter the air groove 20, the air groove 20 is not clogged because a depth of the air groove 20 is large at a portion corresponding to the rib 27.

Embodiment 4

In an embodiment illustrated in FIG. 9 through FIG. 12, communicating pipe 37 is provided as the communicating means in order for communicating lower portions of the shell bodies 2. In FIG.9 the communicating pipe 37 is integrally installed below a bottom surface of the electrolyte container 1, the communicating pipe 37 extends approximately over the entire width of the electrolyte container 1 in a direction of container width (lateral direction of FIG. 9) and communicates to bottom walls of the shell bodies 2 through communicating branch pipes 37a for shell bodies. Namely, insides of all the shell bodies 2 communicate each other at the bottom walls through the communicating pipe 37. Its inside diameter is set to a dimension of 01 to 05 mm, for example, which does not allow the electrolyte (liquid) to replace with air.

Figure 10:
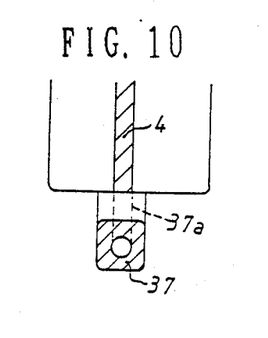
FIG. 10 is an enlarged sectional view taken along a line X—X of FIG. 9.
Figure 11:
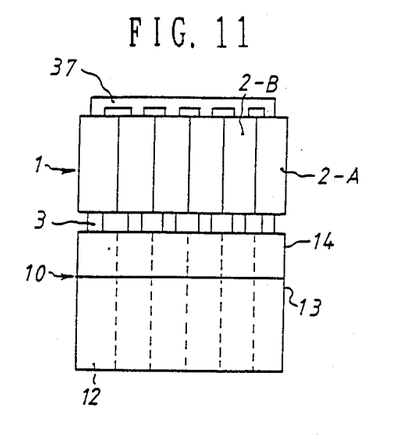
FIG. 11 is a front view of a battery under a state where the electrolyte is filled in the battery and the electrolyte container of FIG. 9.

FIG. 10 is the sectional view taken along the line X—X of FIG. 9, and clearly illustrates the section of the communicating pipe 37.

The filling work using the electrolyte container 1 as illustrated by FIG. 9 and the function of the communicating pipe 37 are similar to those of the embodiment 1 and will be described simply hereunder.

When the electrolyte container 1 is turned upside down and the filling tube 3 is directed downward to be connected to the battery 10 as illustrated by FIG. 3, the electrolyte 5 in each shell body is replaced by air flowing from the air groove 20 into the shell body 2 and is fed to the cell chamber 12.

Even if the filling hole 18 should be clogged with bubbles to cause the failure to fill the electrolyte in the corresponding cell chamber 12 due to fill the surface tension etc. during filling the electrolyte, the filling of the electrolyte will be started or restarted in the same way as the embodiment 1.

Figure 12:
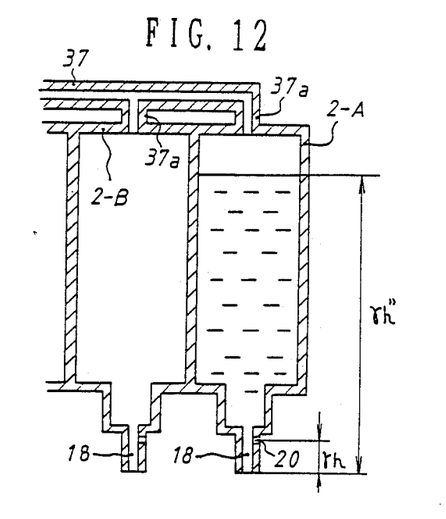
FIG. 12 is a working principle explanatory view during the filling of the electrolyte by using the electrolyte container of FIG. 9.

Namely, as illustrated by the working principle explanatory view of FIG. 12, even if the filling hole 18 corresponding to the shell body 2-A is clogged with bubbles to cause the failure to fill the electrolyte from the shell body 2-A, the inside of the shell body 2-A will communicate with the atmosphere through the communicating pipe 37, and at the same time, the head acting on the bottom of the filling hole 18 will be converted from $\gamma h$ to $\gamma h''$ if only the filling of the electrolyte to any one of other shell bodies has been completed. Consequently, a large head acts abruptly on the bottom of the filling hole 18 to push forth the clogging bubbles so as to commence the filling of the electrolyte in the shell body 2-A.

Effect of the invention

As described above, the electrolyte feeders according to the present invention have the following advantages.

(1) The thin film 6 is formed at the tip end of the filling tube 3 of the container 1 and the upwardly extending filling sleeve 19 is formed on the filling hole of each cell, so that the filling tube 3 can be broken and opened by means of the filling sleeve 19 and at the same time the filling tube 3 can be connected to the filling sleeve 19 by fitting the filling tube 3 of the electrolyte container 1 onto the filling sleeve 19 from upside. Thus, the filling work can be commenced immediately from this state so that an efficiency of the filling work can be improved.

Further, cutting tools such as scissors or nipper etc. become unnecessary and the filling work becomes simple and, at the same time, the spilling of electrolyte and/or scattering of cut-away pieces arising when using the scissors or nipper can further be avoided. (2) Scince the air groove 20 is formed on the outer peripheral surface of the filling sleeve 19 or on the inner peripheral surface of the filling tube 3 to replace the electrolyte in the electrolyte container 1 with air through means of the air groove 20, it becomes unnecessary to make the air hole at the bottom of the electrolyte container 1. Thereby, the filling work can be further simplified. (3) Since the communicating means (communicating hole 7 or communicating pipe 37) in order for communicating lower parts of the shell bodies 2 is provided, even if any one of the filling holes 18 should be clogged with bubbles due to surface tension etc. to cause the failure to fill the electrolyte, a large head will be ensured by means of the communication to the atmosphere and the filling of the electrolyte will be commenced automatically if only the filling of the electrolyte to any one of other shell bodies 2 has been completed.

Namely, an apprehension of the failure to fill the electrolyte can be removed. Especially, the electrolyte feeder is most suited for the compact battery for use in motor bicycle etc. which is apt to produce bubbles.

What is claimed is:

1. An electrolyte feeder for battery including an electrolyte container, said container comprising a shell body filled with an electrolyte in a plurality of spaced cell units equal in number to the number of individual cells in a dry charged storage battery, each of said shell bodies having a filling tube, and said filling tubes being spaced to coincide with the spacing between filling ports of said battery to enable the filling tubes to fit into the corresponding one of the filling ports; characterized by that a thin film is formed at a tip end of the filling tube, each shell body is sealed up by said thin film, a communicating means interconnecting lower parts of shell bodies with each other is provided, a filling hole interconnecting to each cell is provided on each filling port of the battery, an upwardly extending filling sleeve fittable in an inner periphery of the filling tube of electrolyte container is formed on each filling hole, a piercing part is formed on an upper end of the filling sleeve, and an air groove for feeding air into the electrolyte container is formed on a fitting portion between the filling sleeve and the filling tube.

2. An electrolyte feeder for battery as set forth in claim 1, in which communicating holes for communicating the shell bodies with each other for serving as the communicating means are made at lower portions of connecting parts which connect the shell bodies.

3. An electrolyte feeder for battery as set forth in claim 1, in which a communicating pipe is formed integrally below a bottom surface of the electrolyte container for serving as the communicating means, and said communicating pipe communicates to insides of the shell bodies through connecting branch pipes for respective shell bodies.

* * * * *